(12) United States Patent
Suzuki

(10) Patent No.: US 10,321,020 B2
(45) Date of Patent: Jun. 11, 2019

(54) IMAGE PROCESSING APPARATUS, AND IMAGE PROCESSING METHOD

(71) Applicant: CANON KABUSHIKI KAISHA, Tokyo (JP)

(72) Inventor: Takahiro Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/593,092

(22) Filed: May 11, 2017

(65) Prior Publication Data

US 2017/0346994 A1    Nov. 30, 2017

(30) Foreign Application Priority Data

May 30, 2016  (JP) ................. 2016-107412

(51) Int. Cl.
*H04N 1/60* (2006.01)
*G06K 15/00* (2006.01)
*H04N 1/00* (2006.01)
*H04N 1/50* (2006.01)
*G06K 15/02* (2006.01)

(52) U.S. Cl.
CPC ....... *H04N 1/6097* (2013.01); *G06K 15/1848* (2013.01); *G06K 15/4065* (2013.01); *H04N 1/00068* (2013.01); *H04N 1/00092* (2013.01); *H04N 1/50* (2013.01); *H04N 1/6088* (2013.01)

(58) Field of Classification Search
CPC ............. H04N 1/6097; H04N 1/00068; H04N 1/00092; H04N 1/50; H04N 1/6088; G06K 15/1848; G06K 15/4065
USPC ........................................ 358/1.9, 1.15, 518
See application file for complete search history.

(56) References Cited

U.S. PATENT DOCUMENTS

| 2009/0059252 | A1* | 3/2009 | Coyle | G03G 9/0821 358/1.9 |
| 2014/0293341 | A1* | 10/2014 | Yasutomi | H04N 1/6097 358/1.15 |
| 2017/0247560 | A1* | 8/2017 | Watanabe | B41M 5/00 |

FOREIGN PATENT DOCUMENTS

| CN | 103869984 A | 6/2014 |
| CN | 104159023 A | 11/2014 |
| CN | 105144680 A | 12/2015 |

(Continued)

OTHER PUBLICATIONS

Lan et al., "Bi-Scale Appearance Fabrication", ACM Transactions ON Graphics (TOG)—SIGGRAPH 2013 Conference Proceedings TOG Homepage archive, vol. 32, Issue 4.

*Primary Examiner* — Quang N Vo
(74) *Attorney, Agent, or Firm* — Canon USA, Inc., IP Division

(57) ABSTRACT

An image processing apparatus includes an acquisition unit configured to acquire image data including reflection characteristics information indicating reflection characteristics of a material with respect to incident light; a calculation unit configured to calculate, from reflection characteristics indicated by the reflection characteristics information corresponding to each pixel included in an area of a predetermined size in an image indicated by the image data, a statistical amount indicating the reflection characteristics of the area with the predetermined size; and a generation unit configured to generate arrangement data representing an arrangement of a structure including a printing material on a recording medium, based on the statistical amount.

20 Claims, 17 Drawing Sheets

(56) References Cited

FOREIGN PATENT DOCUMENTS

JP        2016-003962 A     1/2016
WO     2006/005831 A1    1/2006

* cited by examiner

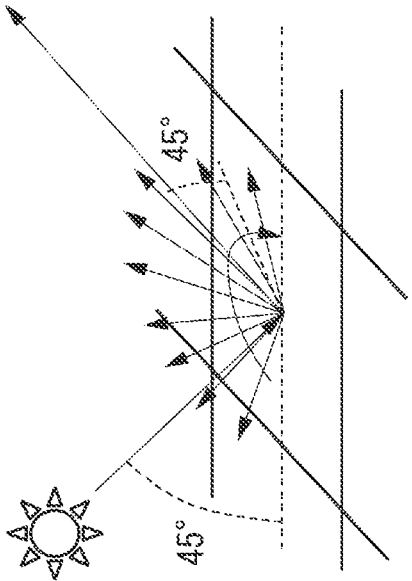
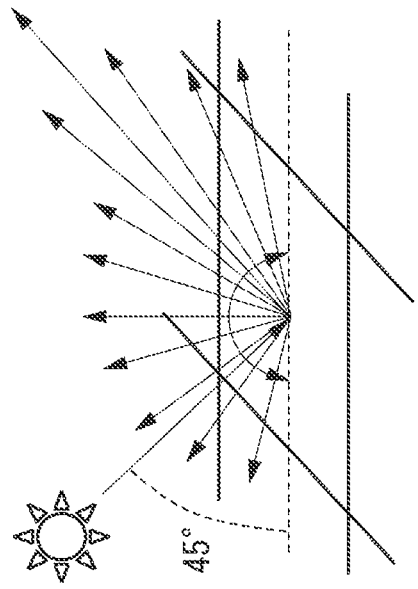

FIG. 17

| MATERIAL NAME | STATISTICAL METHOD |
|---|---|
| VELVET | AVERAGE(ELEVATION ANGLE) |
| SATIN | AVERAGE(AZIMUTH ANGLE), AVERAGE(ELEVATION ANGLE) |
| METAL (METALLIC) | AVERAGE(ELEVATION ANGLE) STANDARD DEVIATION (ELEVATION ANGLE) |
| ⋮ | ⋮ |

IMAGE PROCESSING APPARATUS, AND IMAGE PROCESSING METHOD

BACKGROUND OF THE INVENTION

Field of the Invention

The present invention relates to an image processing technique for reproducing on a recording medium reflection characteristics of an object irradiated with incident light.

Description of Related Art

Spatially Varying Bidirectional Reflectance Distribution Function (SVBRDF) is one technique of describing reflection characteristics of a material with respect to incident light. The SVBRDF describes multi-angular reflection characteristics for each position of a material in accordance with a variation of the angle of incident light/outgoing light. The texture of a material corresponding to a light source/point or view can be reproduced by reproducing the SVBRDF. Yauxiang Lan, Yue Dong, Fabio Pellacini, Xin Tong, in "Bi-Scale Appearance Fabrication", ACM. Transactions on Graphics(TOG)-SIGGRAPH 2013 Conference Proceedings TOG Homepage archive, July 2013, Volume 32, Issue 4 (hereinbelow, referred to as Xin Tong) discusses a technique of reproducing the SVBRDF on a recording medium. In the technique discussed by Kin Tong, the SVBRDF of a target material is input, and structures approximating the SVBRDF are formed. More specifically, predetermined structures to be formed on the recording medium are prepared, and a combination of the structures is optimized to approximate the reflection characteristics of the target material that have been input.

A characteristic texture of a target material may undesirably be lost in a printed object obtained with the technique discussed by Xin Tong. For example, a material such as velvet features a large difference in color appearance when viewpoint is changed along an elevation angle direction. Thus, the SVBRDF of velvet involves a characteristic reflectance change in the elevation angle direction, but involves no large characteristic reflectance change in an azimuth angle direction. Therefore, reproduction of a velvety texture requires reproduction of the SVBRDF focusing more on the reflectance change in the elevation angle direction than in the azimuth angle direction. However, the optimization in the technique discussed by Xin Tong simply focuses on reduction in the difference from the SVBRDF regardless of the elevation angle direction or the azimuth angle direction despite the risk of approximation error, without taking the characteristics of the actual material (e.g., velvet, as described above) into consideration. Therefore, such whole optimization may fail to sufficiently reproduce the texture of certain materials, such as a velvet cloth. More specifically, the characteristic reflectance change in the elevation angle direction may fail to be sufficiently reproduced due to an influence of reflectance in the azimuth angle direction which is not a characteristic feature of the texture of the material. The same applies to a texture of other materials such as metal (metallic) and satin.

SUMMARY OF THE INVENTION

The present invention is directed to addressing the above-noted shortcomings of conventional techniques. To that end, the present disclosure includes various embodiments of image processing apparatus and methods capable of printing with light reflection characteristics reproduced with a higher fidelity to characteristics of a target material.

According to an aspect of the present invention, an image processing apparatus includes a first acquisition unit configured to acquire image data including reflection characteristics information indicating reflection characteristics of a material with respect to incident light, a first calculation unit configured to calculate, from reflection characteristics indicated by the reflection characteristics information corresponding to each of areas included in an area of a predetermined size in an image indicated by the image data, a statistical amount indicating the reflection characteristics of the area with the predetermined size; and a generation unit configured to generate arrangement data representing an arrangement of a structure including a printing material on a recording medium, based on the statistical amount.

Further features of the present invention will become apparent from the following description of exemplary embodiments with reference to the attached drawings.

BRIEF DESCRIPTION OF THE DRAWINGS

FIGS. 5A and 5B are diagrams illustrating Bidirectional Reflectance Distribution Function (BRDF) in an elevation angle direction and an azimuth angle direction, according to the first exemplary embodiment.

FIG. 17 is a diagram illustrating a correspondence relationship between types of materials and statistical amounts according to a modification example.

DESCRIPTION OF THE EMBODIMENTS

Figure 1:
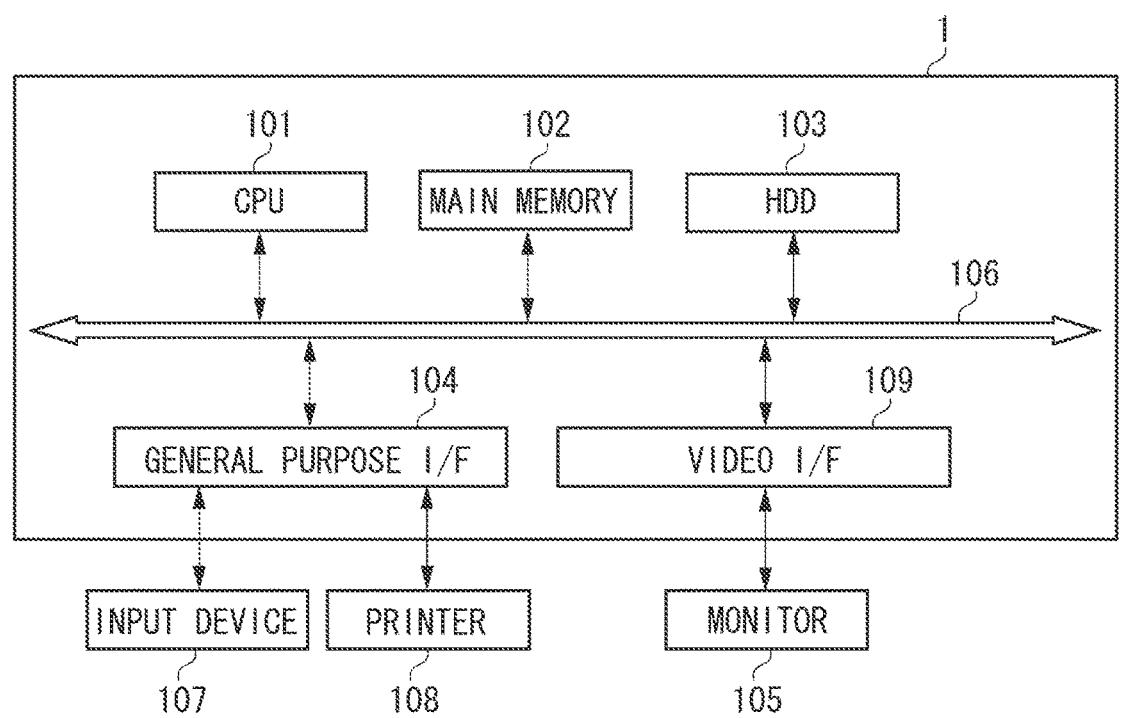
FIG. 1 is a block diagram illustrating a hardware configuration of an image processing apparatus according to a first exemplary embodiment.

An image processing apparatus according to a first exemplary embodiment will be described below. FIG. 1 illustrates an example of a hardware configuration of an image processing apparatus 1 according to the present exemplary embodiment. In FIG. 1, a central processing unit (CPU) 101 executes an operating system (OS) and various programs stored in a hard disk drive (HDD) 103, by using a main memory 102 as a work memory, and controls each component through a system bus 106. A general purpose interface (I/F) 104 is a serial bus interface such as a universal serial bus (USB), for example. An input device 107, such as a keyboard or a mouse for inputting user instructions, a printer 108, and the like are connected to the general purpose I/F 104. A monitor 105 is connected to a video I/F 109. The CPU 101 displays on the monitor 105 a screen of a user interface (UI) provided by a program, and receives user instructions via the input device 107.

Figure 2:
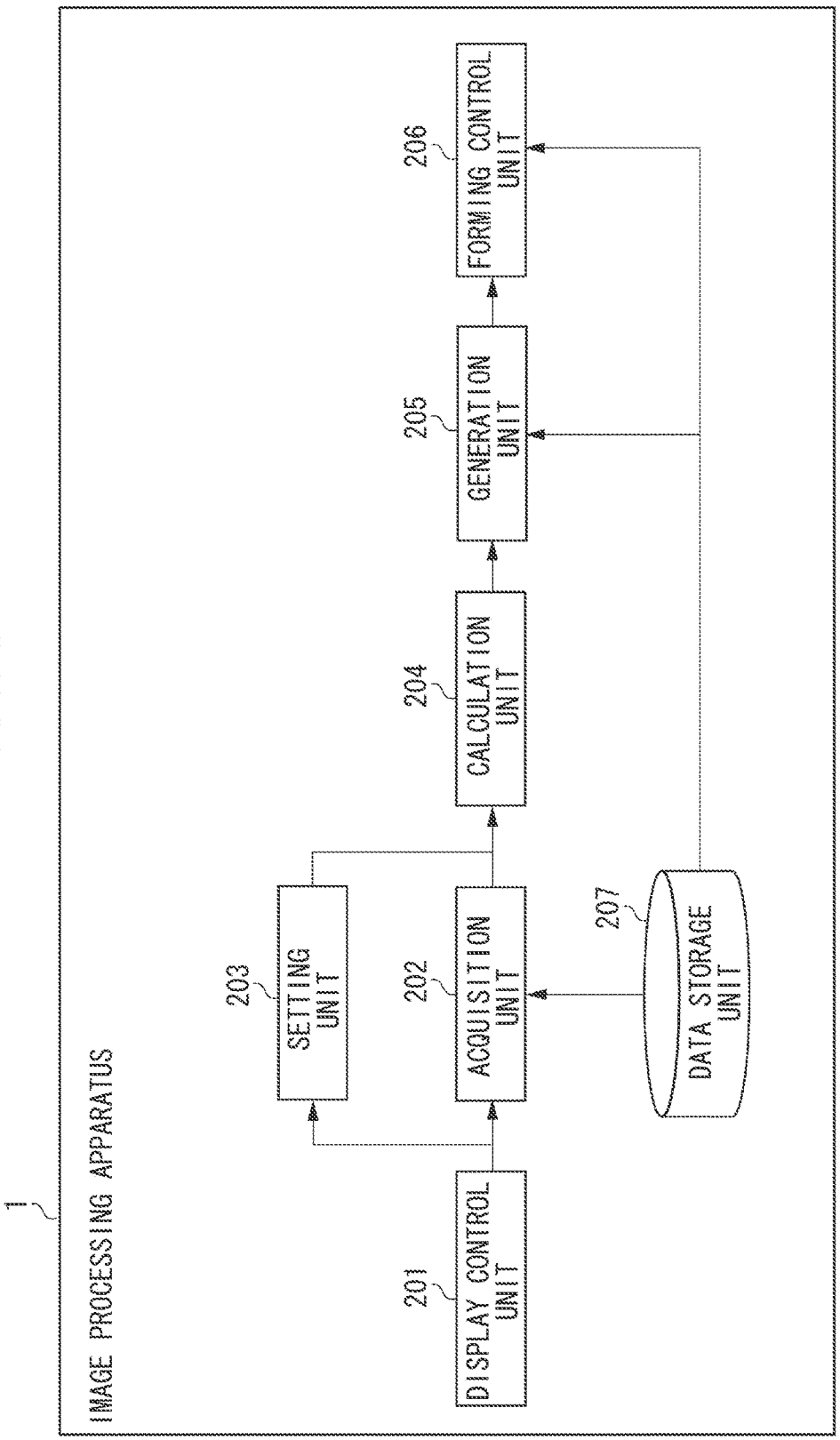
FIG. 2 is a block diagram illustrating a logical configuration of the image processing apparatus according to the first exemplary embodiment.

FIG. 2 is a diagram illustrating a logical configuration of the image processing apparatus 1 according to the present exemplary embodiment. In FIG. 2, the image processing apparatus 1 includes a display control unit 201, an acquisition unit 202, a setting unit 203, a calculation unit 204, a generation unit 205, a forming control unit 206, and a data storage unit 207. The display control unit 201 displays on the monitor 105 a UI screen for receiving instruction inputs from the user. The acquisition unit 202 acquires image data, indicating an image, in which color information and reflection characteristics (Spatially Varying Bidirectional Reflectance Distribution Function (SVBRDF)) information of a target material are stored for each pixel, based on the instruction inputs from the user via the UI screen. The setting unit 203 sets a statistical method for obtaining a statistical amount based on instruction inputs from the user. The calculation unit 204 performs the statistical method set by the setting unit 203 to calculate a statistical amount from the reflection characteristics (SVBRDF) indicated by the reflection characteristics (SVBRDF) information included in the image data acquired by the acquisition unit 202. The generation unit 205 generates arrangement data representing an arrangement of a structure based on the statistical amount. The forming control unit 206 causes the printer 108 to form images based on the arrangement data. The data storage unit 207 stores the image data including the reflection characteristics information of the target material and data on output characteristics and the like of the printer 108.

Figure 3:
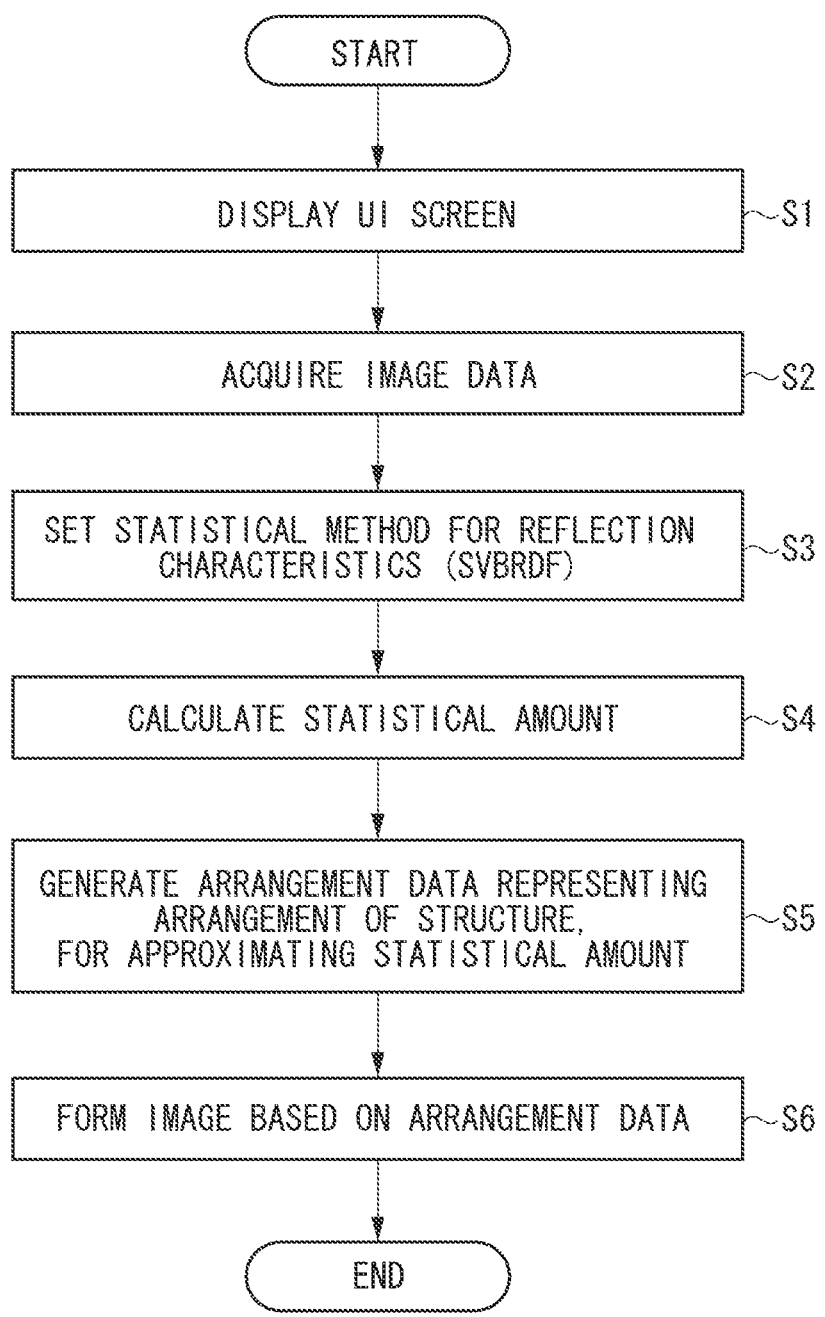
FIG. 3 is a flowchart illustrating image processing executed by the image processing apparatus according to the first exemplary embodiment.

FIG. 3 is a flowchart illustrating processing executed by the image processing apparatus 1.

Figure 4:
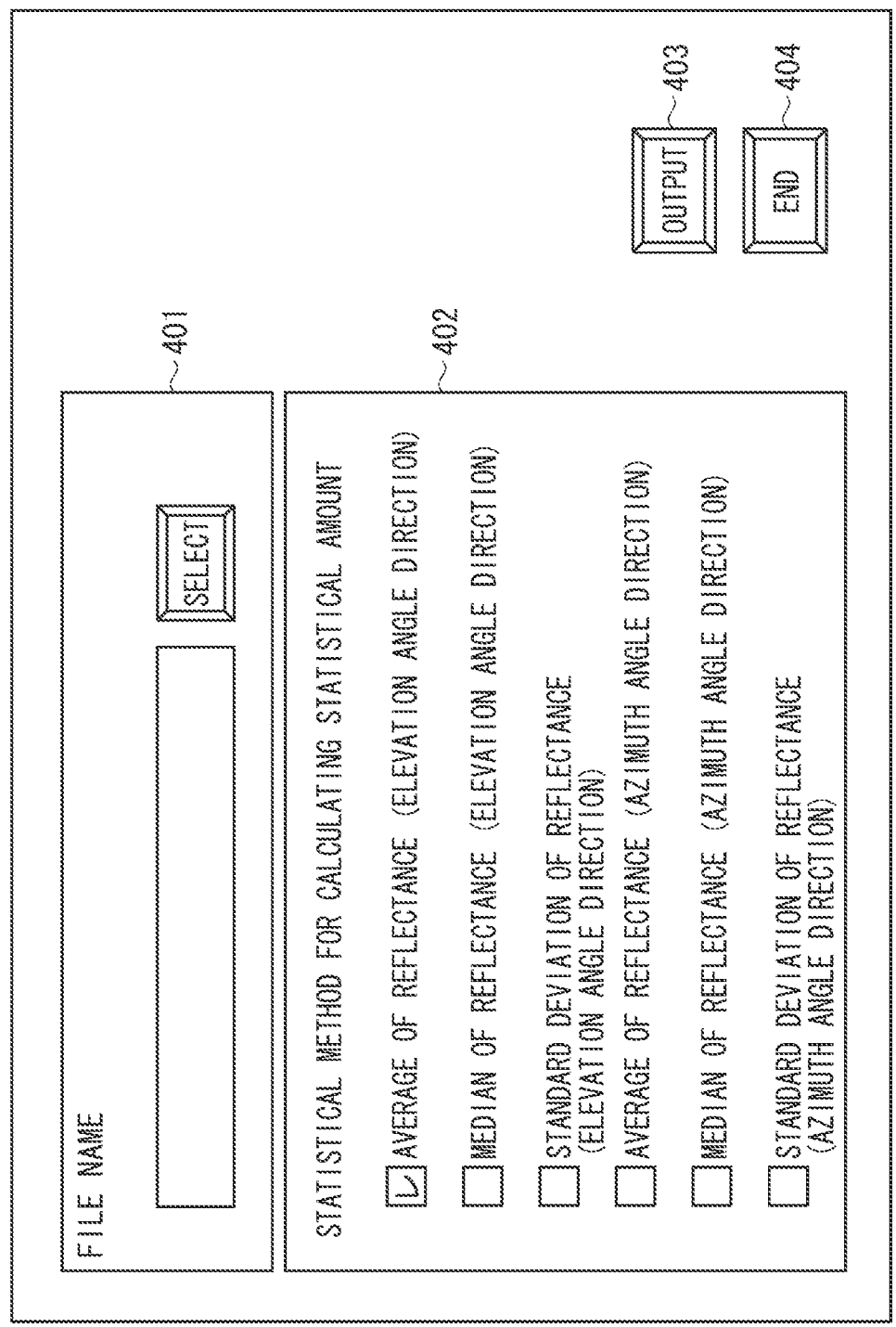
FIG. 4 is a diagram illustrating an example of a user interface (UI) screen according to the first exemplary embodiment.
Figure 6:
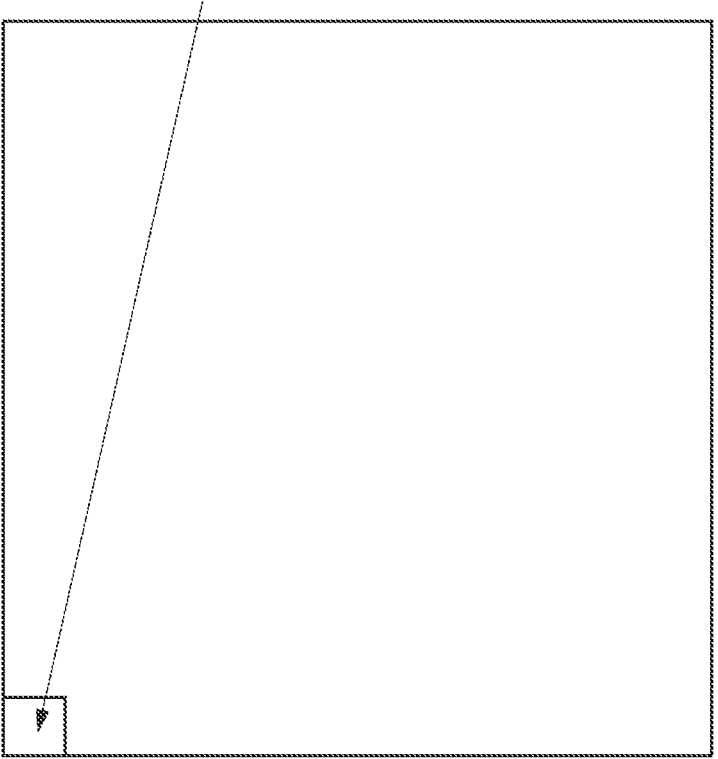
FIG. 6 is a diagram illustrating as example of a data format of image data according to the first exemplary embodiment.

In step S1, the display control unit 201 causes the monitor 105 to display a UI screen for prompting the user to input required information, so that the image processing apparatus 1 can receive required information inputs. FIG. 4 illustrates an example of the UI screen. An instruction input section 401 a section for receiving inputs of a path and a file name of a data file stored in the HDD 103 and the like in advance. In the present exemplary embodiment, data on the path and the file name input in this field is the image data including the reflection characteristics (SVBRDF) information on a target material. The image data according to the present exemplary embodiment is obtained as follows. Specifically, reflected light, from the target material irradiated with light at an angle of 45° with respect to a surface of the target material, is measured at a plurality of light receiving angles, and the resulting reflectance values are stored in each pixel. The BRDF is measured for elevation angles as illustrated in FIG. 5A and for azimuth angles as illustrated in FIG. 5B, to be obtained for each position of the target material, and thus the image data with a data format as illustrated in FIG. 6 is stored in the data storage unit 207. The color information stored in each pixel is red green blue (RGB) values defined in an sRGB space. Alternatively, the color information may be in another format, such as RGB values defined in an Adobe RGB space and Lab values defined in a Lab space. An instruction input section 402 is a section for receiving an input of the statistical method for calculating a statistical amount used for approximating the reflection characteristics of the target material. The statistical amount represents the amount of the reflect on characteristics per unit area of image processing executed by the image processing apparatus 1. The statistical amount according to the present exemplary embodiment is an amount obtained by taking statistics of the reflection characteristics in an area with a print processing size of the printer 108. The print processing size is a minimum possible size with which the printer 108 can represent the BRDF, and is stored in the data storage unit 207 in advance. In the instruction input section 402, a plurality of types of statistical methods can be selected. An output button 403 is used for starting print processing on a recording medium. An end button 404 is used for terminating a series of processing illustrated in FIG. 3. The processing proceeds to step S2 when an instruction input by the user operating the instruction input section 401, the instruction input section 402, and the output button 403 is received. In step S2, the acquisition unit 202 acquires image data from the data storage unit 207. The image data includes the reflection characteristics information on a target material, to be reproduced on the recording medium in accordance with the path name and the file name input as an instruction from the user.

In step S3, the setting unit 203 sets the statistical method input as the instruction by the user. The texture of the target material is reproduced on the recording material by approximating the spatially-varying BRDF (SVBRDF) of the target material with a combination of printing materials. However, the combination of printing materials is difficult to achieve perfect approximation to the SVBRDF of the target material, and is required to achieve approximation to the characteristics of the target material close as much as possible to the perfect approximation. The statistical amount calculated based on the statistical method set as described above includes an average value and values such as a standard deviation of the reflection characteristics of the target material in an elevation angle direction or an azimuth angle direction. Thus, the statistical method suitable for the characteristics of the target material can be input as the instruction by the user to be set. In the present exemplary embodiment, the processing S4 and subsequent steps is described under an assumption that a statistical method is set for calculating an average value of the reflectance in the elevation angle direction.

In step S4, the calculation unit 204 uses the SVBRDF of the target material indicated by the image data acquired in step S2, to calculate the statistical amount using the statistical method set in step S3. The processing in step S4 is described in detail below. In step S5, the generation unit 205 generates the arrangement data representing the arrangement of the structure, for approximating the statistical amount of the SVBRDF of the target material calculated in step S4. The processing in step S5 is described in detail below. In step S6, the forming control unit 206 causes the printer 108 to form an image based on the arrangement data generated in step S5. The processing in step S6 is described in detail below.

Figure 7:
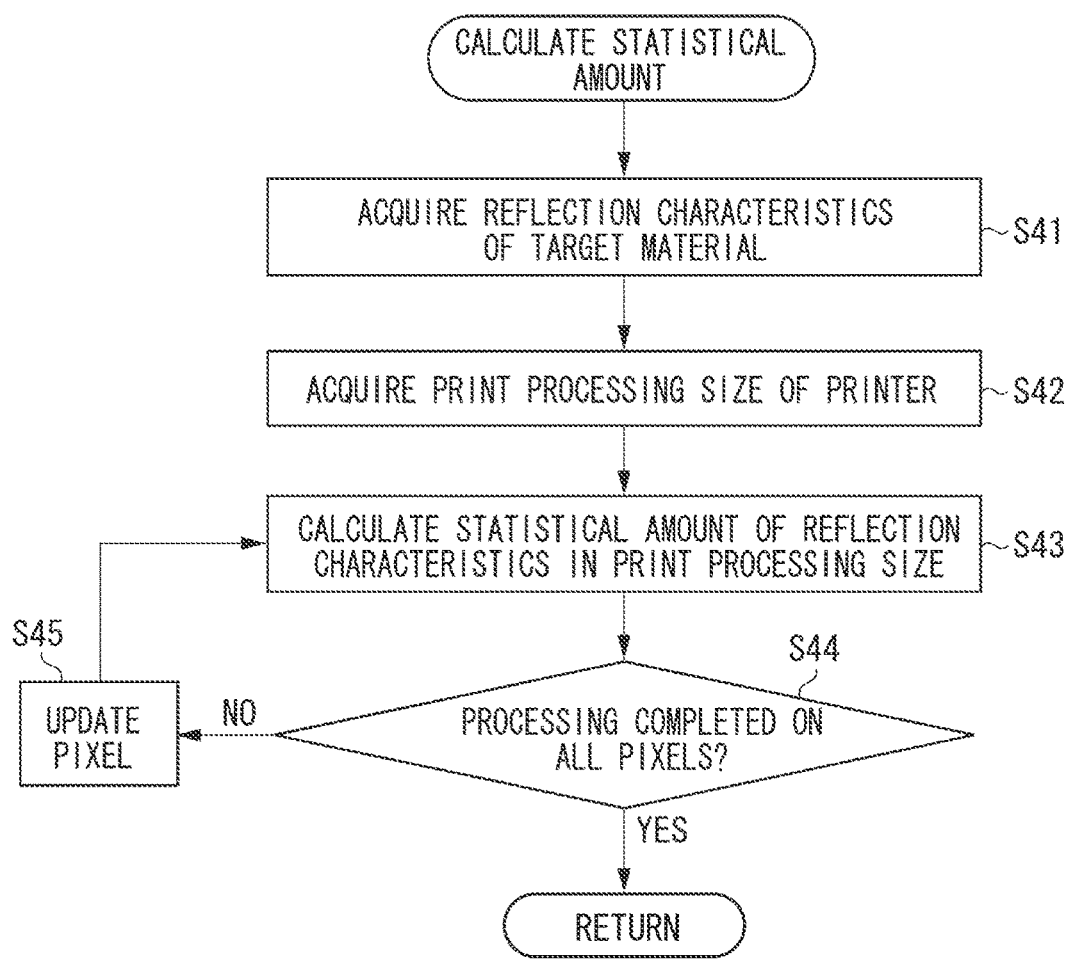
FIG. 7 is a flowchart illustrating statistical amount calculation processing executed by a calculation unit according to the first exemplary embodiment.

FIG. 7 is a flowchart illustrating statistical amount calculation processing executed by the calculation unit 204 in step S4.

Figure 8:
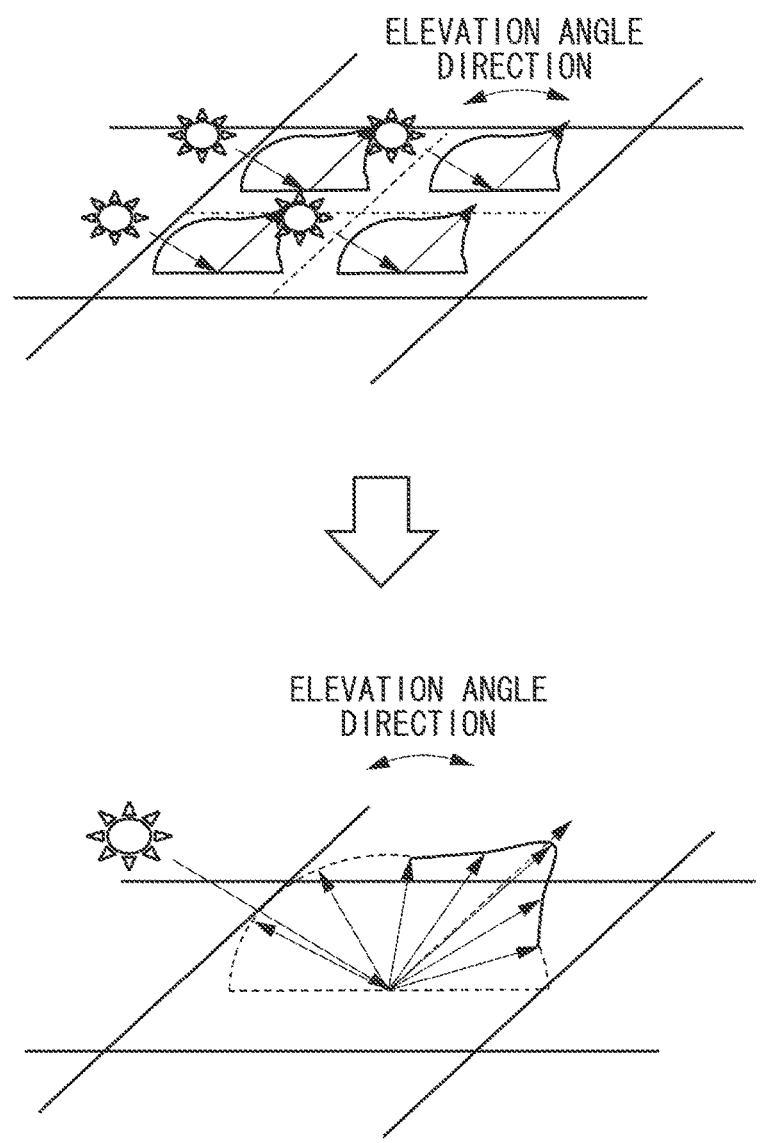
FIG. 8 is a diagram illustrating an outline of the statistical amount calculation processing according to the first exemplary embodiment.

In step S41, the calculation unit 204 acquires the BRDF of the target material stored in each pixel of the image indicated by the image data acquired in step S2. In step S42, the calculation unit 204 acquires the print processing size of the printer 108. In step S43, the calculation unit 204 calculates the statistical amount of the SVBRDF in a partial area, having the print processing size acquired in step S42, in the image. For example, when the print processing size corresponds to four pixels of the image represented by the image data as illustrated in FIG. 8, the calculation unit 204 calculates the statistical amount from the BRDF in each of the four pixels. In the present exemplary embodiment, the average value in the elevation angle direction is set as the statistical method. Thus, an average value $M_{\theta,0}$ of the reflectance of each pixel is calculated with the following formula (1) for each angle in the elevation angle direction. When the print processing size is the same as the size of the pixel, the reflectance in the elevation angle direction is simply extracted for each angle.

$$M_{\theta,0} = \frac{\sum_{n=1}^{4} R_{\theta,0}(n)}{4} \quad (1)$$

In the formula (1), $R_{\theta,0}(n)$ represents the reluctance of a pixel in the print processing size obtained with an elevation angle of $\theta$ and with an azimuth angle of 0°. With formula (1), the average value $M_{\theta,0}$ is calculated for each elevation angle $\theta$. The reflection characteristics information according to the present exemplary embodiment is a reflectance obtained with the azimuth angle fixed to 0°. Therefore, the average value $M_{\theta,0}$ is calculated with formula (1) with the azimuth angle of 0°. Alternatively, the reflectance of a plurality of azimuth angles may be acquired as the reflection characteristics information, and the average may be calculated by performing calculation similar to formula (1) for each azimuth angle $\varphi$. In step S44, the calculation unit 204 determines whether the processing has been completed for all the pixels in the image data. When the processing has been completed on all the pixels (YES in step S44), the processing returns to the flow of FIG. 3. On the other hand, when the processing has not been completed on all the pixels (NO in step S44), the processing proceeds to step S45. In step S45, the calculation unit 204 updates the pixel (advances to the next pixel), and the processing returns to step S43 until all pixels in the print processing size are processed.

Figure 9:
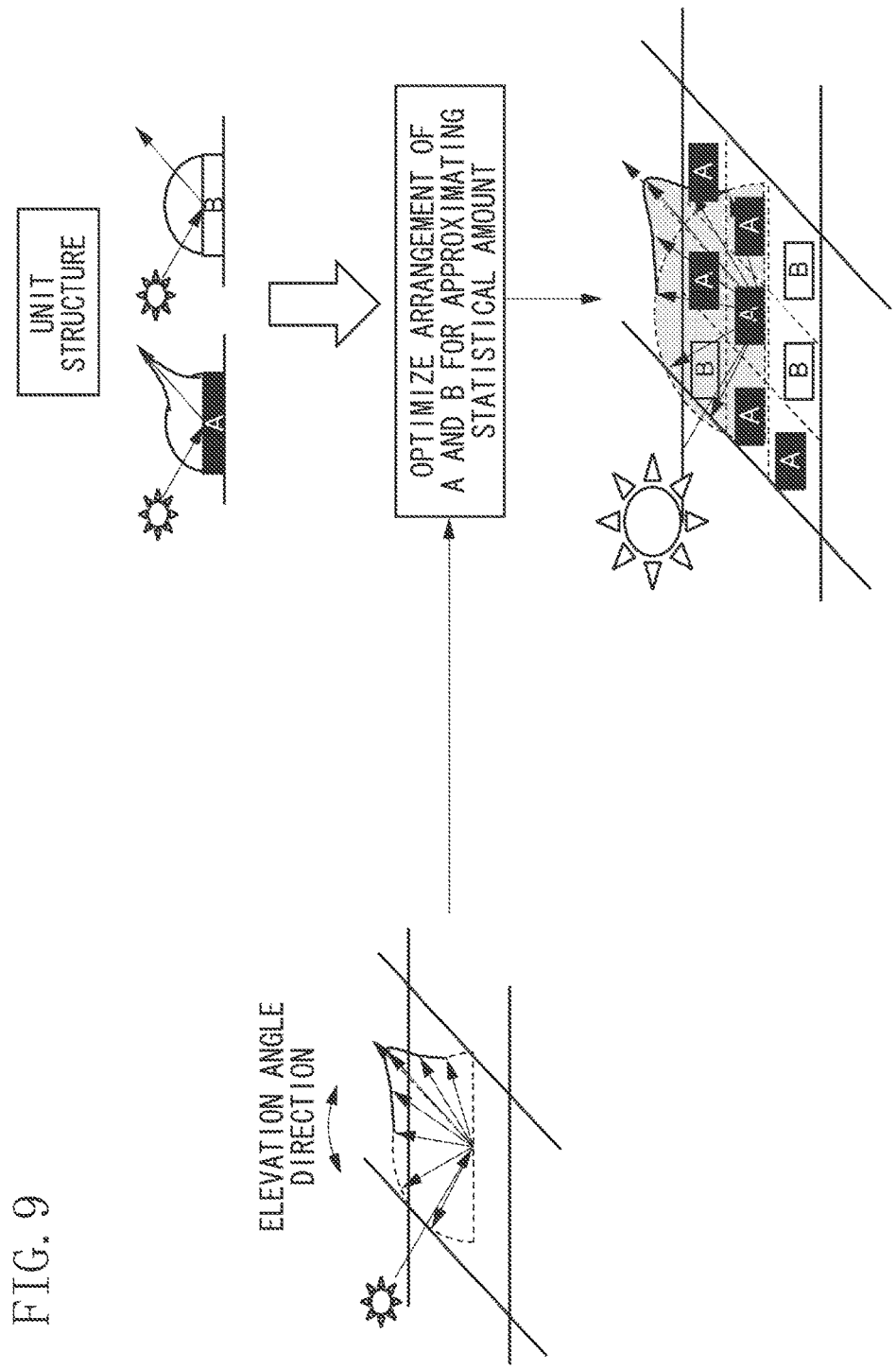
FIG. 9 is a diagram illustrating approximation of a statistical amount with a two-dimensional arrangement of unit structures according to the first exemplary embodiment.
Figure 10:
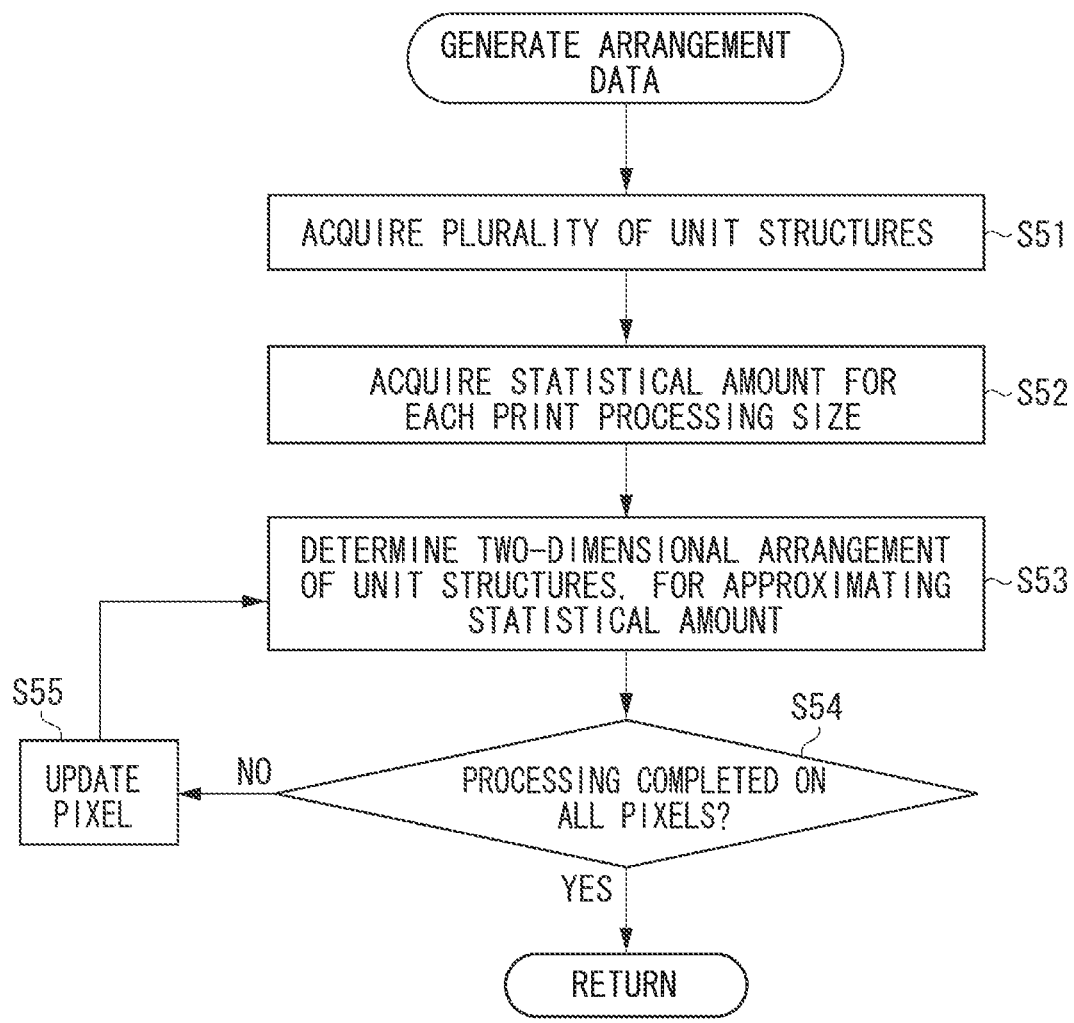
FIG. 10 is a flowchart illustrating processing executed by a generation unit according to the first exemplary embodiment.

An outline of the processing executed by the generation unit 205 in step S5 is described with reference to FIG. 9. The forming control unit 206 can issue an instruction for forming a plurality of unit structures illustrated in a right upper portion in FIG. 9. Each of the unit structures is an object, having a structure of a stack of ink, with known reflection characteristics. The data storage unit 207 stores information such as the reflection characteristics of the unit structure and the recording amount of the ink for reproducing the reflection characteristics. The recoding amount of the ink includes the recording amount of clear ink and white ink for reproducing the reflection characteristics. The recording amount of colored ink, for determining the color of the unit structure, needs not be stored in advance. The forming control unit 206 can control the SVBRDF of the area with the print processing size by controlling a two-dimensional arrangement of the unit structures in the print processing size. In step S5, the generation unit 205 executes processing of determining the two-dimensional arrangement of the unit structures, so that the reflection characteristics of the surface of the recording medium, on which the unit structures are arranged, are approximated to the statistical amount of the reflection characteristics in the area with the print processing size calculated in step S4. The processing executed by the generation unit 205 is described in detail below. FIG. 10 is a flowchart illustrating the processing executed by the generation unit 205 in step S5.

In step S51, the forming control unit 206 acquires the unit structure that can be formed by issuing an instruction to the printer 108. In step S52, the forming control unit 206 acquires the statistical amount the area with the print processing size calculated in step S4. In step S53, the forming control unit 206 determines the two-dimensional arrangement of the unit structures in the area with the print processing size acquired in step S52, and generates arrangement data representing the arrangement. The two-dimensional arrangement may be determined through optimization and the like. For example, the two-dimensional arrangement of the unit structures may be determined so that an evaluation value F, as defined by Equation (2) below, is minimized. More specifically, such processing is executed that the reflectance obtained with unit structures A illustrated in FIG. 9 arranged over the entire printing surface is set as an initial value, and the arrangement is gradually updated to reduce the evaluation value E toward the minimum value. When a plurality of statistical methods is set, the optimization may be performed with any one of the methods, such as the average value or the standard deviation value, prioritized in accordance with the characteristics of the material, or with the methods equally prioritized. In the present exemplary embodiment, the processing is executed to minimize the evaluation value E. However, the target value is not limited to the minimum value as long as the value is small enough to describe the characteristics of the target material.

$$E = \sum_{\theta=0}^{180} ((R(\theta) - T(\theta))^2) \quad (2)$$

In the formula of Equation (2), $R(\theta)$ is a statistical amount acquired with the elevation angle $\theta$, and $T(\theta)$ is reflectance obtained with the unit structures in the two-dimensional arrangement and with the elevation angle $\theta$. $R(\theta)$ in the present exemplary embodiment is an average value of the reflectance obtained with the elevation angle $\theta$. In step S54, the forming control unit 206 determines whether the processing has been completed on all the areas with the print processing size (pixels). When all the pixels have been processed (YES in step S54), the processing returns to the flow process of FIG. 3. When not all the pixels have been processed (NO in step S54), the processing proceeds to step S55. In step S55, the forming control unit 206 updates the pixel (advances to the next unprocessed pixel), and the processing returns to step S53 until all pixels in each print processing size are processed.

Figure 11:
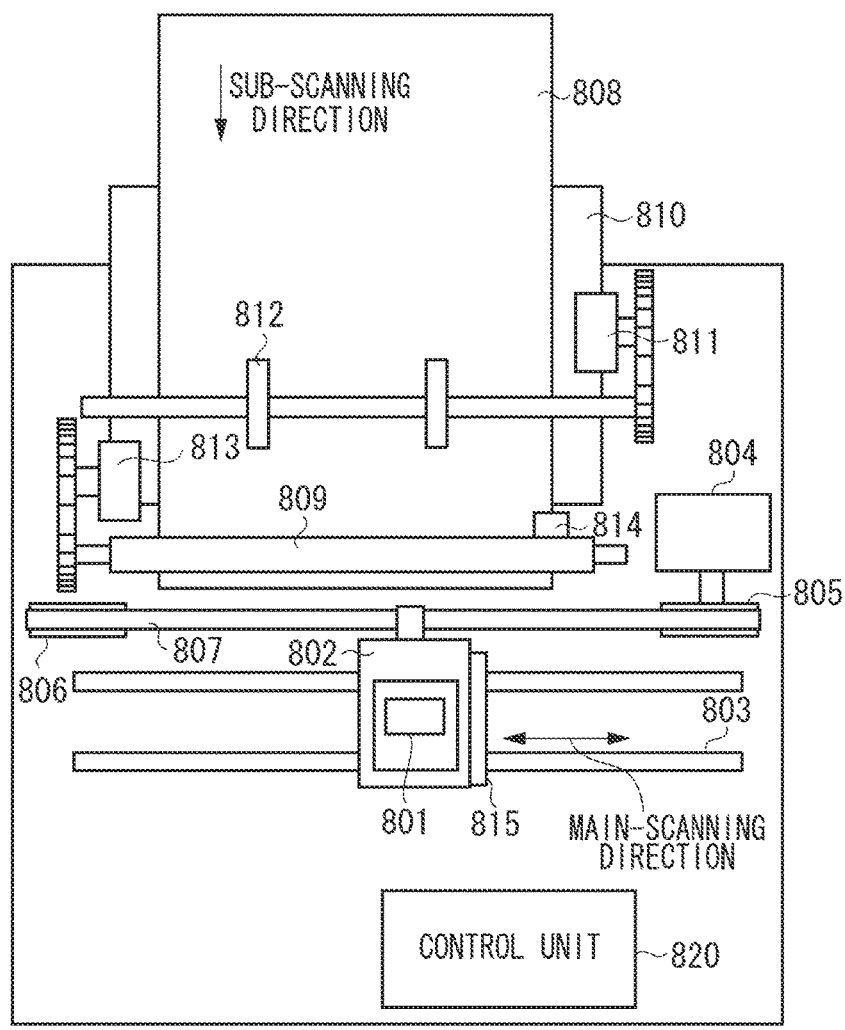
FIG. 11 is a diagram illustrating an example of a configuration of a printer according to the first exemplary embodiment.

FIG. 11 is a diagram illustrating a configuration of the printer 108 that forms an image in response to an instruction from the forming control unit 206. A head cartridge 801 includes a recording head with a plurality of discharge ports and an ink tank from which ink is supplied to the recording head. The recording head is provided with a connector for receiving signals for driving each discharge port of the recording head, and the like. The ink tank includes six types of ink including a clear ink for forming a transparent layer, white ink for controlling optical scattering property, as well as a cyan (C) ink, a magenta (N) ink, a yellow (Y) ink, and a black (K) ink for color control, which are provided independently from each other. The head cartridge 801 is positioned and installed on a carriage 802 in a replaceable manner. The carriage 8 is provided with a connector holder for transmitting a driving signal and the like to the head cartridge 801 via the connector. The carriage 802 can move back and forth along a guide shaft 803. More specifically, the carriage 802 is driven and has the position and the movement controlled with a main-scanning motor 804 as a driving source, and via a driving mechanism such as a motor pulley 805, a driven pulley 806, and a timing belt 807. In the present exemplary embodiment, the movement of the carriage 802 along the guide shaft 803 is referred to as a "main scanning", and the direction of this movement is referred to as a "main-scanning direction". Recording media 808, such as transmissive films for printing, are placed on an automatic sheet feeder (ASF) 810. When an image is formed, pickup rollers 812 are driven by a sheet feed motor 811 and are rotated via a gear, whereby the recording media 808 on the ASF 810 are separated one by one to be fed. Then, a conveyance roller 809 rotates to convey each of the recording media 808 to a recording start position facing a discharge port surface of the head cartridge 801 on the carriage 802. The conveyance roller 809 is driven via a gear with a line feed (LF) motor 813 serving as a driving source. Whether the recording medium 808 is fed and the position thereof at the time of sheet feeding are determined when the recording medium 808 passes through a paper end sensor 814. The head cartridge 801 mounted on the carriage 802 is held in such a manner that the discharge port surface protrudes downward from the carriage 802 to be in parallel with the recording medium 808. A control unit. 820 controls each part of the printer 108. To simplify the description, the printer 108 according to the present exemplary embodiment is assumed to be a binary printer that controls ON/OFF of ink discharge at a predetermined resolution. It is a matter of course that a system that can adjust the size of an ink droplet to be discharged may be employed.

Now, an image forming operation is described. First of all, when the recording medium 808 is conveyed to the recording start position, the carriage 802 moves over the recording medium 808 along the guide shaft 803, with the ink discharged from the discharge ports of the recording head during the movement. When the carriage 802 moves to one end of the guide shaft 803, the conveyance roller 809 conveys the recording medium 808 in a direction orthogonal to the scanning direction of the carriage 802, by a predetermined amount. In the present exemplary embodiment, this conveyance of the recording medium 808 is referred to as "sheet feed" or "sub scanning", and the direction of the conveyance is referred to as "sheet feed direction" or "sub-scanning direction". When the predetermined amount of conveyance of the recording medium 808 is completed, the carriage 802 moves again along the guide shaft 803. An image is formed over the entire recording medium 808 with the scanning by the carriage 802 of the recording head and the sheet feed being repeated. When the printer 108 employs ultraviolet (UV) light curing, UV light may be emitted after the inks are discharged. The recording medium 808 used in the present exemplary embodiment may be in any format capable of forming an image thereon with the recording head. The printer employing inkjet printing method is described in the present exemplary embodiment, but the printer may employ other recording methods such as an electrophotographic method.

Figure 12:
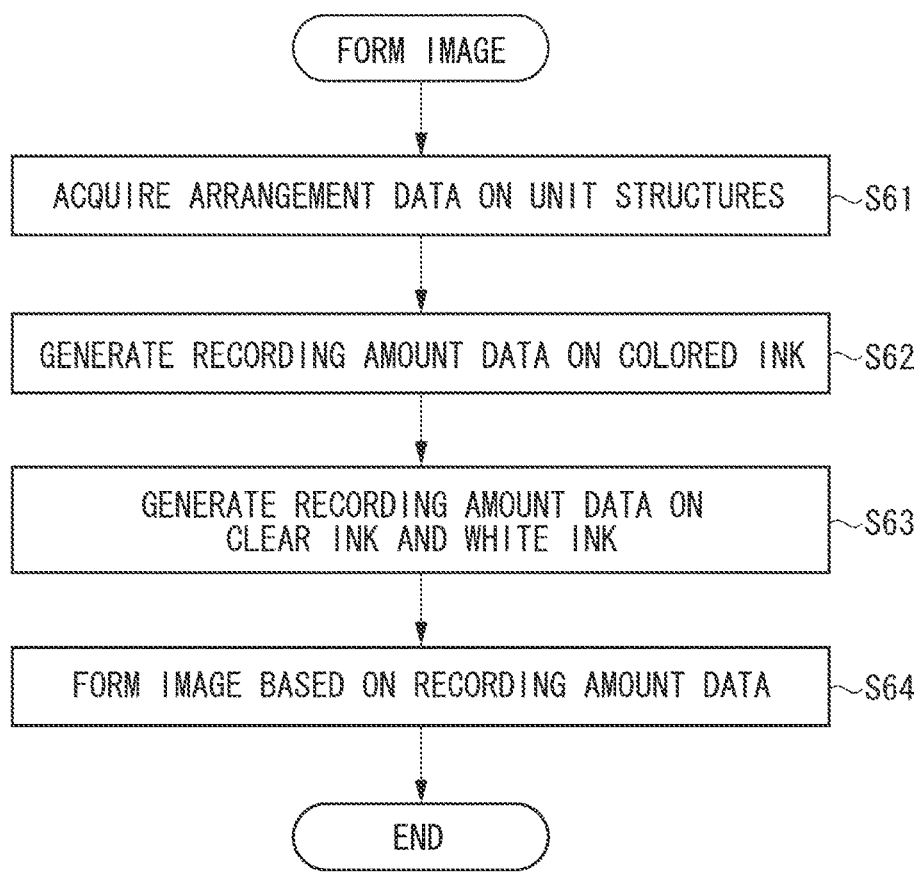
FIG. 12 is a flowchart illustrating image forming processing executed by a forming control unit according to the first exemplary embodiment.

Now, the processing executed by the forming control unit 206 is described with reference to FIG. 12. FIG. 12 is a flowchart of the processing executed by the forming control unit 206 in step S6.

In step S61, the forming control unit 206 acquires the arrangement data representing the two-dimensional arrangement of the unit structure generated in step S5. In step S62, the forming control unit 206 generates four-plane recording amount data for the colored inks (CMYK ink) in accordance with the arrangement data indicating the two-dimensional arrangement of the unit structures, and the color information stored for each pixel of the image data. For example, the colored ink recording amount data may be generated based on a table and the like indicating the correspondence relationship between the color information (RUB value) and the recording amount of each colored ink. In step S63, the forming control unit 206 generates two-plane recording amount data based on the arrangement data indicating the two-dimensional arrangement of the unit structures, and recording amounts of the clear ink and the white ink for reproducing the reflection characteristics stored in the data storage unit 207. In step S64, the forming control unit 206 forms an image by issuing an instruction to the printer 108 for performing recording with each ink, based on the four-plane recording amount data generated in step S62 and the two-plane recording amount data generated in step S63, and the processing is terminated.

The image processing apparatus 1 according to the present exemplary embodiment described above calculates the statistical amount representing the characteristics of a target material from the SVBRDF of the target material, and forms a unit structure on a recording medium with a printing material, so that the reflection characteristics of a surface of the recording medium on which the unit structures are arranged are approximated to the statistical amount. Thus, a printed object can be formed with the characteristics of the target material more favorably reproduced with a higher fidelity.

In the first exemplary embodiment, the user directly inputs the statistical method for calculating a statistical amount. In a second exemplary embodiment, the statistical method representing the characteristics of a target, material is automatically obtained from the SVBRDF of the acquired target material.

Figure 13:
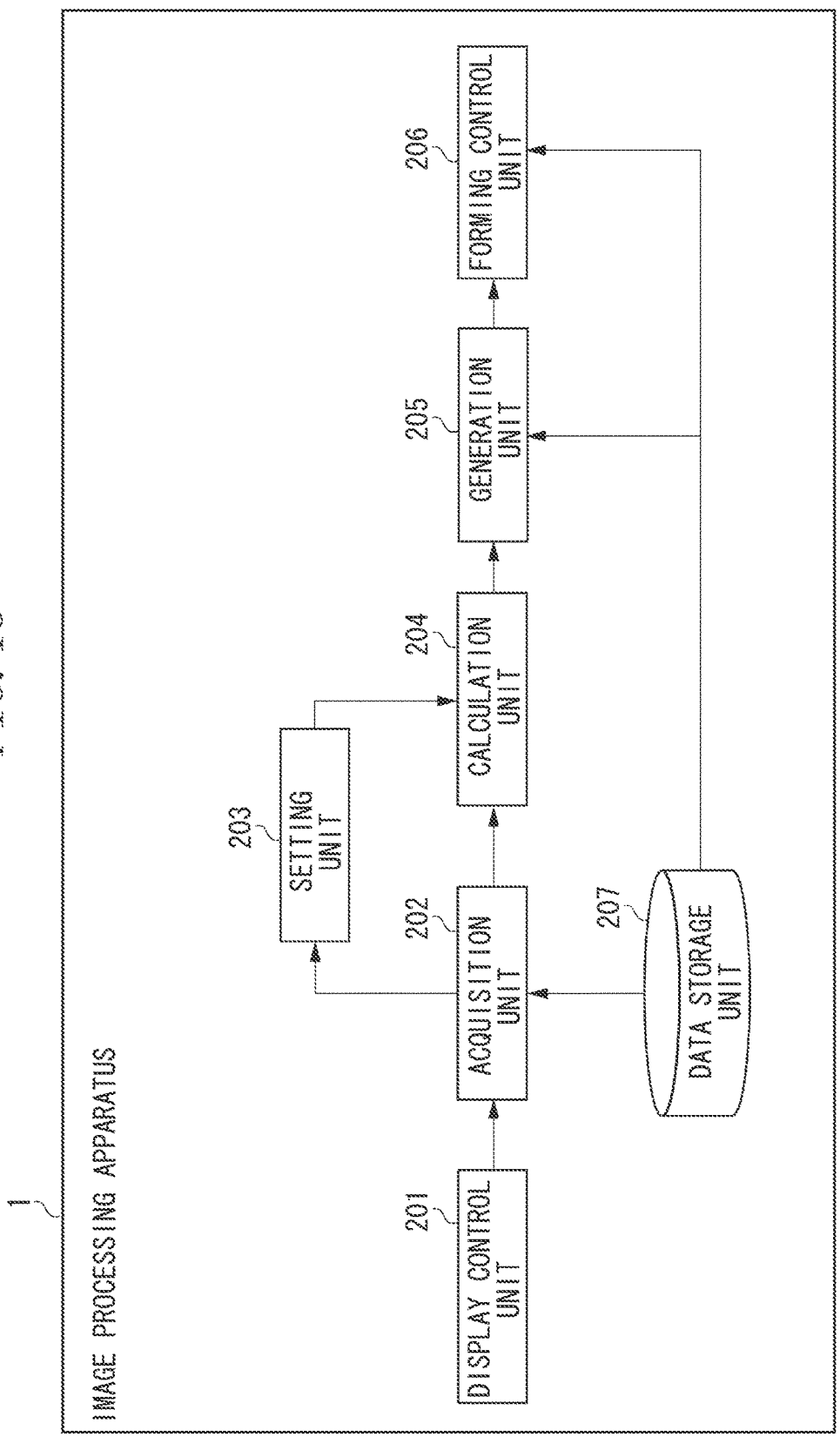
FIG. 13 is a block diagram illustrating a logical configuration of an image processing apparatus according to a second exemplary embodiment.

The image processing apparatus 1 according to the second exemplary embodiment has similar hardware configuration to that in the first exemplary embodiment. FIG. 13 is a diagram illustrating a logical configuration of the image processing apparatus according to the present exemplary embodiment. The image processing apparatus 1 illustrated in FIG. 13 includes the display control unit 201, the acquisition unit 202, the setting unit 203, the calculation unit 204, the generation unit 205, the forming control unit 206, and the data storage unit 207, as in the first exemplary embodiment. In the present exemplary embodiment, the setting unit 203 executes processing based on the reflection characteristics information in the image data acquired by the acquisition unit 202. Accordingly, the present exemplary embodiment is different from the first exemplary embodiment in the processing executed by the setting unit 203 in step S3.

Thus, the processing executed in step S3 is mainly described, and the description on the other processing is omitted.

Figure 14:
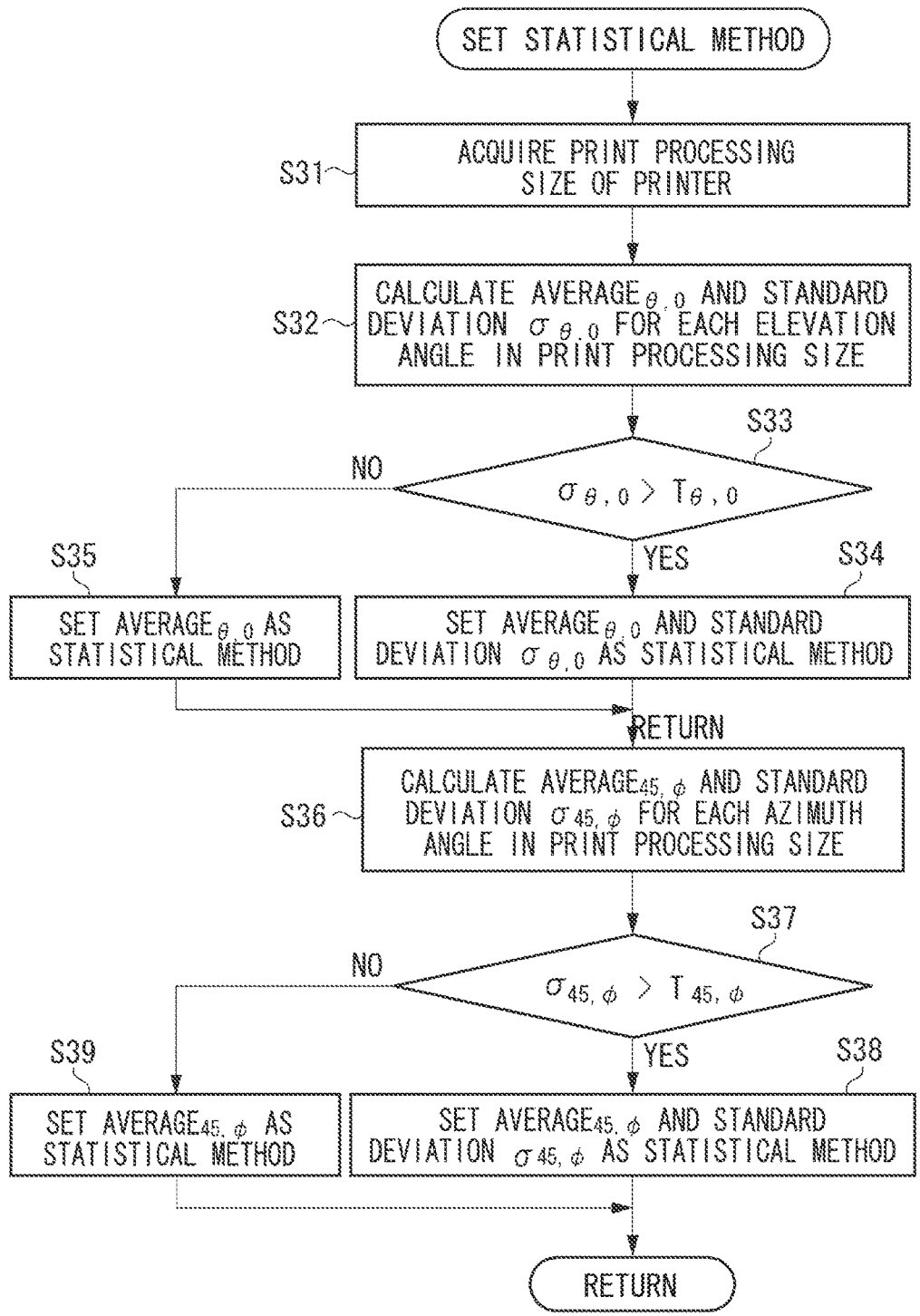
FIG. 14 is a flowchart illustrating statistical method setting processing executed by a setting unit according to the second exemplary embodiment.

FIG. 14 is a flowchart illustrating processing of setting the statistical method executed in step S3 according to the present exemplary embodiment.

In step S31, the setting unit 203 acquires the print processing size of the printer 108. In step S32, the setting unit 203 calculates the average value $M_{\theta,0}$ and a standard deviation $\sigma_{\theta,0}$ of the reflectance for each elevation angle $\theta$ in the area with the print processing size. The average value $M_{\theta,0}$ can be calculated with formula (1) as in the case described above. The standard deviation $\sigma_{\theta,0}$ can be calculated with the following formula (3).

$$\sigma_{\theta,0} == \sqrt{\frac{\sum_{n=1}^{N}(M_{\theta,0} - R_{\theta,0}(n))^2}{N}} \quad (3)$$

In the formula (3), N represents the number of pixels within the area with the print processing size. The standard deviation $\sigma_{\theta,0}$ indicates the variation of the luminance at each elevation angle in the area with the print processing size. A target material with a large standard deviation $\sigma_{\theta,0}$ has a characteristic known as a glitter feeling with sparkle points glittering in the elevation angle direction. In step S33, the standard deviation $\sigma_{\theta,0}$ is compared with a predetermined threshold $T_{\theta,0}$. When $\sigma_{\theta,0} > T_{\theta,0}$ holds true (YES in step S37), the processing proceeds to step S34. On the other hand, when $\sigma_{\theta,0} \leq T_{\theta,0}$ holds true (NO in step S37), the processing proceeds to step S35.

Processing in step S34 is executed when the standard deviation $\sigma_{\theta,0}$ is determined to be larger than the threshold $T_{\theta,0}$. When the standard deviation $\sigma_{\theta,0}$ is larger than the threshold $T_{\theta,0}$, the setting unit 203 determines that the target material has a glitter feeling, and sets the standard deviation $\sigma_{\theta,0}$ in addition to the average value $M_{\theta,0}$ as the statistical method for calculating the statistical amount representing the characteristics of the target material. Processing in step S35 is executed when the standard deviation $\sigma_{\theta,0}$ is determined to be not larger than the threshold $T_{\theta,0}$. When the standard deviation $\sigma_{\theta,0}$ is determined to be not larger than the threshold $T_{\theta,0}$, the setting unit 203 determines that the target material has no glitter feeling and has the characteristics that can be described by approximating the average luminous characteristics only, and thus sets only the average value $M_{\theta,0}$ as the statistical method.

In step S36, the setting unit 203 calculates an average value $M_{45,\varphi}$ and standard deviation $\sigma_{45,\varphi}$ of reflectance for each azimuth angle $\varphi$ in the area with the print processing size. The average value and the standard deviation $\sigma_{45,\varphi}$ are calculated in a manner similar to those described above using formula (1) and formula (3), and thus the description thereof is omitted. The standard deviation $\sigma_{45,\varphi}$ represents the variation of luminance at each azimuth angle in the area with the print processing size. The target material with a large standard deviation $\sigma_{45,\varphi}$ has a characteristic known as a glitter feeling with sparkle points glittering in the azimuth angle direction. In step S37, the setting unit 203 compares the standard deviation $\sigma_{45,\varphi}$ with a standard deviation threshold $T_{45,\varphi}$ set in advance. When $\sigma_{45,\varphi} > T_{45,\varphi}$ holds true (YES in step S37), the processing proceeds to step S38. When $\sigma_{45,\varphi} \leq T_{45,\varphi}$ holds true (NO in step S37), the processing proceeds to step S39.

Processing in step S38 is executed when the standard deviation $\sigma_{45,\varphi}$ is determined to be larger than the threshold $T_{45,\varphi}$. When the standard deviation $\sigma_{45,\varphi}$ is larger than the threshold $T_{45,\varphi}$, the setting unit 203 determines that the target material has a glitter feeling, and sets the average $M_{45,\varphi}$ and the standard deviation $\sigma_{45,\varphi}$ as the statistical method for the statistical amount representing the characteristics of the target material. Processing in step S39 is executed when the standard deviation $\sigma_{45,\varphi}$ is determined to be not larger than the threshold $T_{45,\varphi}$. When the standard deviation $\sigma_{45,\varphi}$ is determined to be not larger than the threshold $T_{45,\varphi}$, the setting unit 203 determines that the target material has no glitter feeling and has characteristics that can be described by approximating the average luminous characteristics only. Thus, the setting unit 203 sets only the average $M_{45,\varphi}$ as the statistical method, and the processing returns to the flow process of FIG. 3.

As described above, the image processing apparatus described in the present exemplary embodiment sets the statistical method for calculating the statistical amount representing the characteristics of the target material, based on the SVBRDF of the target material. In this way, a printed object favorably approximated to the characteristics of the target material can be automatically formed, without requiring a user input for designating the statistical method.

Figure 15:
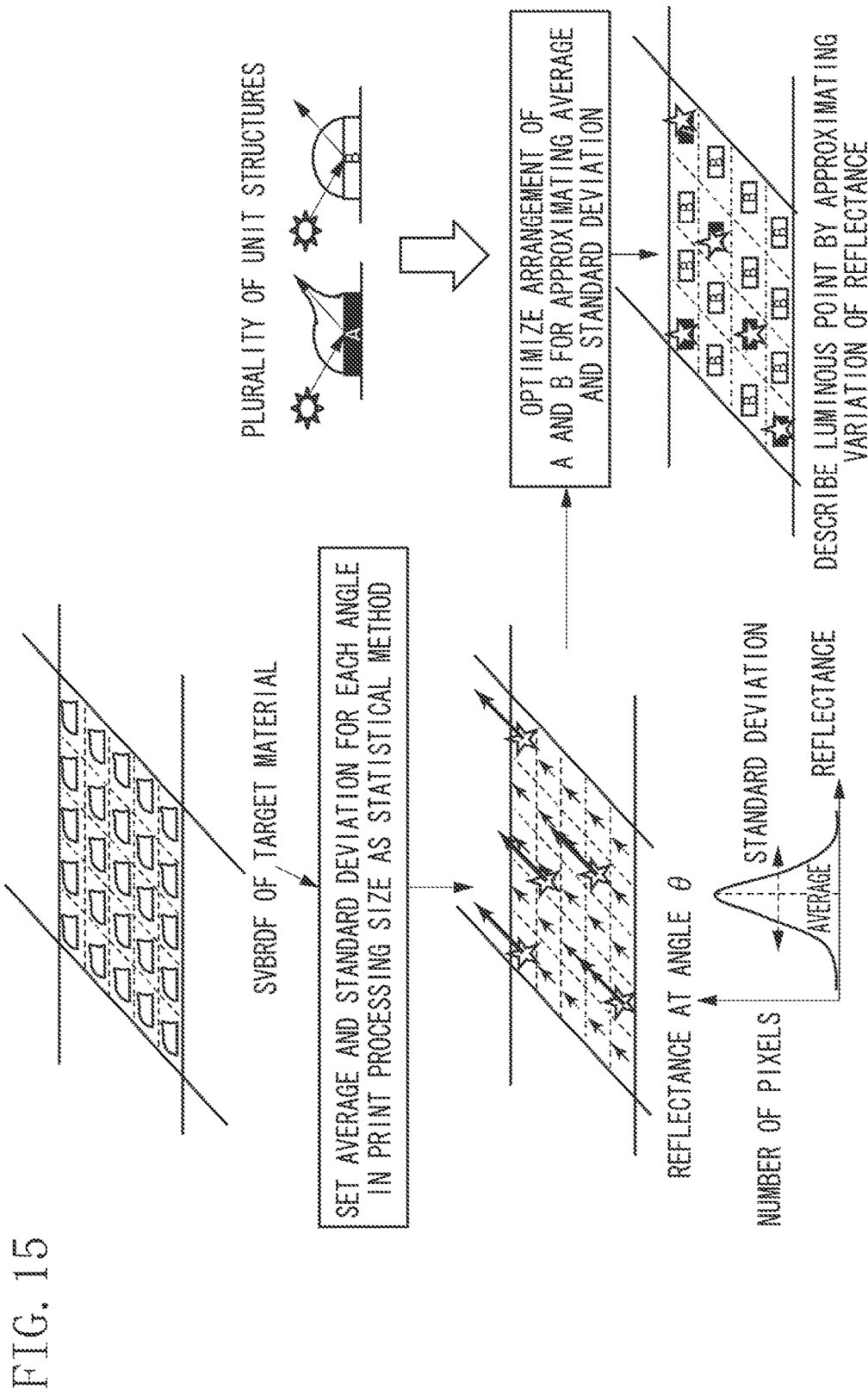
FIG. 15 is a diagram illustrating approximation of a statistical amount according to the second exemplary embodiment.

The reflection characteristics information according to the present exemplary embodiment includes reflectance obtained from various elevation angles with the azimuth angle fixed to 0° (zero degrees), and reflectance obtained from various azimuth angles with the elevation angle fixed to 45°. Therefore, the processing is executed by using the average and the standard deviation obtained with the fixed azimuth angle, or the fixed elevation angle. Alternatively, the SVBRDF with various azimuth angles and elevation angles may be used. In such a case, comparison with the threshold may be performed for each combination between the azimuth angle and the elevation angle. In an example described below with reference to FIG. 15, not only the average but also the standard deviation is set as the statistical method in the present exemplary embodiment and a printed object is formed by approximating these values. As illustrated in FIG. 15, the forming control unit 206 optimizes the two-dimensional arrangement of the unit structures to approximate the average and the standard deviation calculated from the SVBRDF of the target material. This configuration is different from that in the first exemplary embodiment in that not only the average value but also the standard deviation, that is, variation in the area with the print processing size is approximated. The amount and the brightness (luminance) of the bright spots can be described by approximating the standard deviation. The glitter feeling depends on aspects such as an amount and light intensity of bright spots, and the positions of the bright spots are irrelevant. Therefore, the characteristics of the target material can be described with a higher fidelity by approximating the average value and the standard deviation.

<Modification>

In the exemplary embodiments described above, the statistical amount includes an average value, a mean value, and a standard deviation of reflectance. However, the statistical amount according to the present invention is not limited thereto. For example, other statistical amounts such as a maximum value, a minimum value, a mode, a skewness, or a kurtosis may be employed.

In the exemplary embodiments described above, the reflection characteristics information of a target material stored in the image data is described as "reflectance obtained by measuring reflected light, from the target material irradiated with light at a projection angle of 45° with respect to a surface of the target material, at plurality of light receiving angles". However, the reflection characteristics information of the target material is not limited thereto. The projection angle (incident angle) of a light source is not limited to 45° and may be other angles. Furthermore, the SVBRDF based on different projection angles may be employed. In such a case, the light receiving angle may be fixed, or changed together with the projection angle so that SVBRDF with a degree of freedom of 2 is obtained. Data to be measured is not limited to the reflectance data and may be reflection intensity data indicated by spectral radiance, a RGB data obtained by an image sensor, or the like.

In the exemplary embodiment described above, the forming control unit 206 can form two types of unit structures. However, the number of formable types is not limited as long as a plurality of types (two or more types) can be formed.

In the exemplary embodiments described above, the two-dimensional arrangement of the unit structures is determined by using the evaluation value E as a sum of minimum mean square errors. However, the evaluation value according to the present invention is not limited to the minimum mean square error. Any evaluation value indicating a difference from the statistical amount can be employed.

Figure 16:
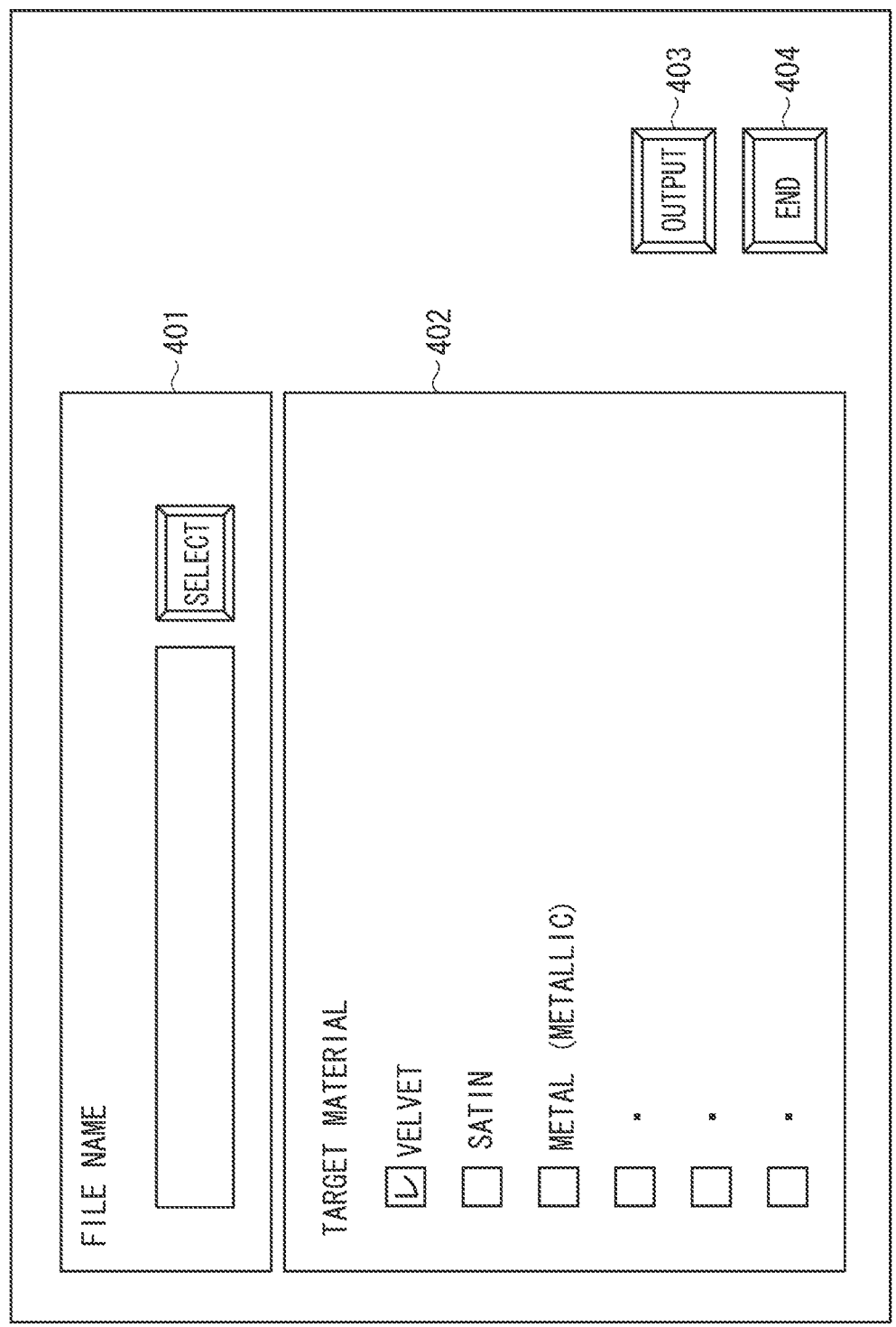
FIG. 16 is a diagram illustrating an example of a user interface (UI) screen according to a modification example.

In the first exemplary embodiment described above, the user directly selects the statistical method on the UI screen illustrated in FIG. 4. For example, a target material may be selected as illustrated in FIG. 16. When the user selects a material, a statistical method for calculating the statistical amount representing the characteristics of the selected material is automatically set. In this configuration, a correspondence table, as illustrated in FIG. 17, indicating a correspondence relationship between materials and statistical methods may be prepared, so that the statistical method can be selected in accordance with the correspondence table. Examples of materials illustrated in FIG. 17 include a velvet cloth, a satin cloth, and metal (metallic). However, the table may include other materials.

In the exemplary embodiments described above, the color information is stored in each pixel of an image represented by the input image data. However, the present invention is not limited thereto. The reflection characteristics information may include reflection intensity of reflected light for each wavelength, instead of the color information. When only the reflection characteristic is to be reproduced, image data including no color information may be input, and the image may be formed based only on a correspondence relationship between the unit structures and the recording amount of each ink.

In the exemplary embodiments described above, a colored ink is used as the colored material. Alternatively, colored toner may be used. Similarly, the clear ink may be clear toner, and the white ink may be white toner.

According to the present invention, printing can be achieved with light reflection characteristics reproduced with a higher fidelity to characteristics of a target material.

Other Embodiments

Embodiment (s of the present invention can also be realized by a computer of a system or apparatus that reads out and executes computer executable instructions (e.g., one or more programs) recorded on a storage medium (which may also be referred to more fully as a 'non-transitory computer-readable storage medium') to perform. the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2016-107412, filed May 30, 2016, which is hereby incorporated by reference herein in its entirety.

What is claimed is:

1. An image processing apparatus comprising:
   a first acquisition unit configured to acquire image data including reflection characteristics information in association with each pixel, the reflection characteristic information indicating a plurality of values of reflection intensity or reflectance in a plurality of directions, the plurality of values of reflection intensity or reflectance being obtained by receiving reflected light of a material while changing at least one of a light incident angle and a light receiving angle;
   a first calculation unit configured to calculate, for part of the plurality of directions, a statistical amount of reflection intensity or reflectance indicated by the reflection characteristic information corresponding to each pixel included in an area of a predetermined size; and
   a generation unit configured to generate arrangement data representing an arrangement of a structure including a printing material on a recording medium, based on the statistical amount in each of the part of the plurality of directions,
   wherein the structure is a three-dimensional object formed by stacking the printing material.

2. The image processing apparatus according to claim 1, further comprising a setting unit configured to set a statistical method for the first calculation unit to calculate the statistical amount, based on the reflection characteristics information,
   wherein the first calculation unit is configured to calculate the statistical amount in each of the part of the plurality of directions, using the statistical method set by the setting unit.

3. The image processing apparatus according to claim 1, further comprising:

a reception unit configured to receive an instruction from a user; and a setting unit configured to set a statistical method for the first calculation unit to calculate the statistical amount, based on the instruction received from the user, wherein the first calculation unit is configured to calculate the statistical amount in each of the part of the plurality of directions, using the statistical method set by the setting unit.

4. The image processing apparatus according to claim 1, wherein the statistical amount is an average value of the reflection intensity or reflectance indicated by the reflection characteristics information.

5. The image processing apparatus according to claim 1, wherein the statistical amount is a standard deviation of the reflection intensity or reflectance indicated by the reflection characteristics information.

6. The image processing apparatus according to claim 1, further comprising a second acquisition unit configured to acquire information on the structure, wherein the generation unit is configured to generate the arrangement data further based on the information on the structure.

7. The image processing apparatus according to claim 1, further comprising a second calculation unit configured to calculate an evaluation value representing a difference between the reflection characteristics of the material indicated by the statistical amount and the reflection characteristics represented by the structure, wherein the generation unit is configured to generate the arrangement data based on the evaluation value.

8. The image processing apparatus according to claim 7, wherein the generation unit is configured to generate the arrangement data so as to minimize the evaluation value.

9. The image processing apparatus according to claim 1, wherein the material is velvet cloth, and wherein the statistical amount is an average value of the plurality of values of reflection intensity or reflectance in each of the part of the plurality of directions, the plurality of values of reflection intensity or reflectance being obtained by receiving the reflected light while fixing the light incident angle and an azimuth angle of the light receiving angle and changing an elevation angle of the light receiving angle.

10. The image processing apparatus according to claim 1, wherein the material is satin cloth, and wherein the statistical amount is an average value of the plurality of values of reflection intensity or reflectance in each of the part of the plurality of directions obtained by receiving the reflected light while fixing the light incident angle and an azimuth angle of the light receiving angle and changing an elevation angle of the light receiving angle, and an average value of the plurality of values of reflection intensity or reflectance in each of the part of the plurality of directions obtained by receiving the reflected light while fixing the light incident angle and the elevation angle of the light receiving angle and changing the azimuth angle of the light receiving angle.

11. The image processing apparatus according to claim 1, wherein the material is a metal, and wherein the statistical amount is an average value and a standard deviation of the plurality of values of reflection intensity or reflectance in each of the part of the plurality of directions obtained by receiving the reflected light while fixing the light incident angle and an azimuth angle of the light receiving angle and changing an elevation angle of the light receiving angle.

12. The image processing apparatus according to claim 1, further comprising a forming unit configured to form the image indicated by the image data by forming the structure on the recording medium based on the arrangement data.

13. The image processing apparatus according to claim 12, wherein the first acquisition unit is configured to acquire image data including the reflection characteristics information, and color information indicating the color of the image, further comprising a determination unit configured to determine a recording amount of a printing material used for forming the structure based on color information, wherein the forming unit is configured to form the image further based on the recording amount of the printing material determined by the determination unit.

14. The image processing apparatus according to claim 13, wherein the printing material includes a color material and an ultraviolet printing material that is curable.

15. The image processing apparatus according to claim 1, wherein the first acquisition unit is configured to acquire the image data from a storage unit configured to store the image data in advance, the image data being obtained by measuring the reflection characteristics of the material.

16. The image processing apparatus according to claim 1, wherein the first calculation unit calculates the statistical amount of reflection intensity or reflectance corresponding to each of a plurality of elevation angles of the light receiving angle at part of azimuth angles of the light receiving angle.

17. The image processing apparatus according to claim 1, wherein the first calculation unit calculates the statistical amount of reflection intensity or reflectance corresponding to each of a plurality of azimuth angles of the light receiving angle at part of elevation angles of the light receiving angle.

18. An image processing apparatus comprising:

an acquisition unit configured to acquire reflection characteristics data including reflection characteristics information indicating a plurality of values of reflection intensity or reflectance in a plurality of directions, the plurality of values of reflection intensity or reflectance being obtained by receiving reflected light of a material while changing at least one of a light incident angle and a light receiving angle;

an extraction unit configured to extract reflection intensity or reflectance in part of the plurality of directions from the plurality of values of reflection intensity or reflectance in the plurality of directions, based on the reflection characteristics data; and a generation unit configured to generate arrangement data representing an arrangement of a structure including a printing material on a recording medium, based on the reflection intensity or reflectance in the part of the plurality of directions extracted by the extraction unit, wherein the structure is a three-dimensional object formed by stacking the printing material.

19. An image processing method for an image processing apparatus, the method comprising:

acquiring image data including reflection characteristics information in association with each pixel, the reflection characteristic information indicating a plurality of values of reflection intensity or reflectance in a plurality of directions, the plurality of values of reflection intensity or reflectance being obtained by receiving reflected light of a material while changing at least one of a light incident angle and a light receiving angle;

calculating, for part of the plurality of directions, a statistical amount of reflection intensity or reflectance indicated by the reflection characteristic information corresponding to each pixel included in an area of a predetermined size; and generating arrangement data representing an arrangement of a structure including a printing material on a recording medium, based on the statistical amount in each of the part of the plurality of directions, wherein the structure is a three-dimensional object formed by stacking the printing material.

20. A non-transitory computer-readable storage medium storing instructions that, when executed by a computer, cause the computer to perform a method comprising:

acquiring image data including reflection characteristics information in association with each pixel, the reflection characteristic information indicating a plurality of values of reflection intensity or reflectance in a plurality of directions, the plurality of values of reflection intensity or reflectance being obtained by receiving reflected light of a material while changing at least one of a light incident angle and a light receiving angle;

calculating for part of the plurality of directions, a statistical amount of reflection intensity or reflectance indicated by the reflection characteristic information corresponding to each pixel included in an area of a predetermined size; and generating arrangement data representing an arrangement of a structure including a printing material on a recording medium, based on the statistical amount in each of the part of the plurality of directions, wherein the structure is a three-dimensional object formed by stacking the printing material.

* * * * *